April 11, 1967 P. ANDERSEN 3,313,461
STEERING AND CONTROL DEVICE
Filed April 19, 1966 2 Sheets-Sheet 1
FIG.1
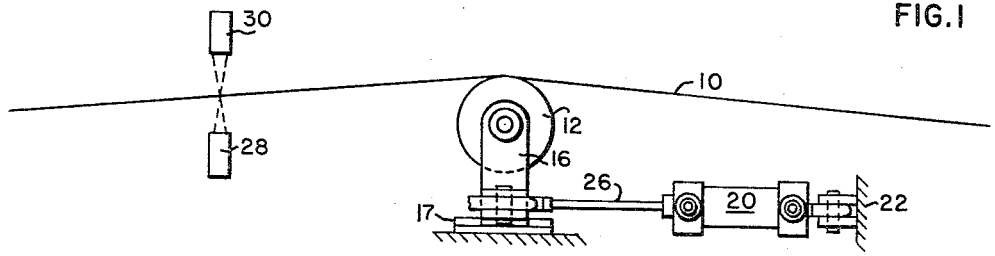
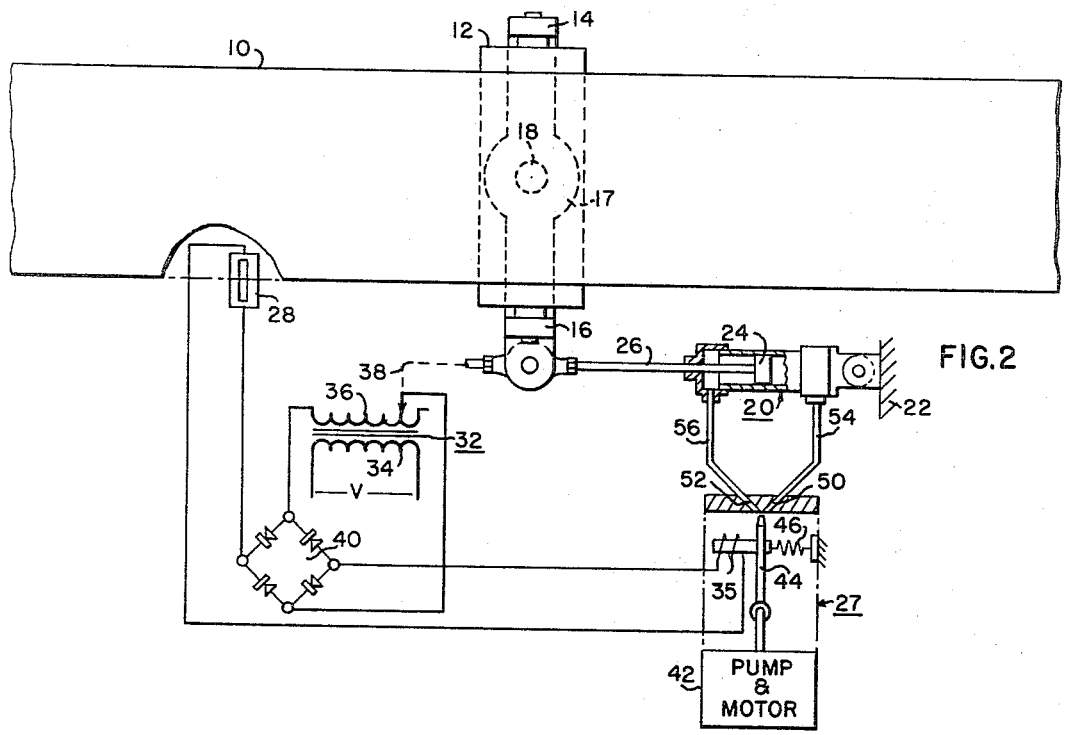
FIG.2
INVENTOR.
POUL ANDERSEN
BY *William N. Hogg*
ATTORNEY April 11, 1967  P. ANDERSEN  3,313,461

STEERING AND CONTROL DEVICE

Filed April 19, 1966  2 Sheets-Sheet 2

INVENTOR.
POUL ANDERSEN
BY William N. Hogg
ATTORNEY 3,313,461
STEERING AND CONTROL DEVICE
Poul Andersen, Wallingford, Conn., assignor to Allegheny
 Ludlum Steel Corporation, Brackenridge, Pa., a corpo-
 ration of Pennsylvania
Filed Apr. 19, 1966, Ser. No. 549,742
5 Claims. (Cl. 226—20)

This application is a continuation-in-part of application Ser. No. 315,845 entitled "Steering and Control Device" filed Oct. 14, 1963 and now abandoned.

This invention relates to materials handling equipment, and more particularly to systems for maintaining moving strip material on a given pass line.

In an even more particular aspect, this invention is concerned with an edge guide system incorporating a feed-back control which will apply a corrective steering vector to strip material proportional to the magnitude of variation of the strip from a selected pass line.

In the processing of strip material, it is frequently necessary to maintain the strip on a given pass line, i.e., the material must travel on a given path with deviation from the path being quickly and accurately corrected. For example, in cold rolling steel strip, processing requirements may make it necessary to direct the strip into the rolls on a given path to center the strip in the rolls, and deviation from this path may result in variations of thickness and surface quality of the product. Sometimes edge guides are used adjacent the rolls to physically guide or funnel the strip onto the proper path. These physical guides, however, have a propensity to damage the edges of the strip, which may result in waste. Also, some material is not sufficiently rigid to be amenable to physical guidance by these contacting-type edge guides. Therefore, industry has developed non-contacting systems which will guide the strip by sensing the edge location of the strip adjacent rolls and applying corrective steering at the pay-off reel or pass line rolls, or both, to change the angle of the entry of the strip into the rolls. These systems employ sensing devices which sense the position of the edge of the strip and actuate the steering means when the strip deviates from the pass line. Lateral movement, or steering, is accomplished by vectoring a portion of the force of the moving strip laterally. This vectoring can be accomplished by moving the pay-off reel to change the angle of the strip or by rotating a pass-line roll, or by other similar methods. However, a characteristic of these systems is that they vector laterally a portion of the force of the moving strip, and when the strip is not moving they cannot change the lateral position of the strip since there is no force to vector, although a control signal is generated and the steering controls actuated. Hence, with the prior art steering systems, when the strip is stopped in a position off the pass line, a control signal is generated which actuates the steering mechanism; but, since correction of the position of the strip does not result from the actuation of the steering controls, the signal will continue to operate the controls until their limit has been reached. Then, when the strip is started, the action of the steering controls at maximum correction will apply a large correction steering vector, causing a rapid lateral movement of the strip and a very large over-correction will occur. The steering means and sensing mechanism must then compensate in the opposite direction to return the strip to the pass line. This additional time can mean a substantial amount of strip being moved off center.

Also, with these prior art steering devices, the steering controls are actuated until the strip reaches the pass line, at which time the signal ceases and the actuation of the steering devices ceases. However, at this position the steering devices are in a position which is still causing a lateral vector which will cause the strip to continue to move and over-correct. Correction in the opposite direction is then initiated, with the same result. This phenomenon, known as hunting, is characterized by the strip being continuously over-corrected. This hunting phenomenon can be reduced by changing the sensitivity of response of the edge sensing mechanism, but the required sensitivity is a function of the strip speed and hence would have to be changed for each change in speed of the strip. Hunting cannot be completely eliminated, however, by merely changing the sensitivity of response.

One practical method to overcome these disadvantages of the prior art systems is shown and described in my Patent No. 3,040,944 entitled: "Edge Guide Feed-Back System." In that patent, I provided a signal proportional to the strip deviation from the pass line which produces corrective steering vector proportional to the strip deviation from the pass line, so that when the strip reaches the pass line the steering device has eliminated the steering vector. However, the proportionality feature is attained by mounting the edge sensing device for movement in a path transverse to the path of travel of the strip and moving the edge sensing device proportional to the steering movement which it initiates, and in this manner proportionality is obtained. However, the mechanical linking mountings for moving the edge sensing devices are expensive, and adjustment is complicated.

It is, therefore, a principal object of this invention to provide a device for maintaining a moving strip of material on a given pass line by providing a steering vector to the strip proportional to its deviation from a given path wherein the deviation is sensed by a stationary sensing head.

A more particular object of this invention is to provide a device for maintaining a strip of moving material on a given pass line, which device employs a stationary sensing head which prevents hunting and over-correction by electronic proportioning signal modification.

Yet another, more general object of this invention is to provide a steering and control device for maintaining a moving strip of material on a given pass line which does not require a change in sensitivity for changes in strip speed and which will eliminate hunting and over-correction.

Still a further object of this invention is to provide a method for proportionally controlling the steering vector of a moving strip of material to maintain the strip on a given pass line.

These and other objects, together with a fuller understanding of this invention, will become apparent from the following description when taken in conjunction with the accompanying drawings in which:

FIGURE 1 is a schematic showing, in elevation, of a moving strip of material passing over a roll incorporating the steering controls of this invention;

FIG. 2 is a plan view, somewhat schematic, of the arrangement of FIG. 1, incorporating one embodiment of the steering and control device of this invention for maintaining the strip of material on a selected pass line;

Figure 3:
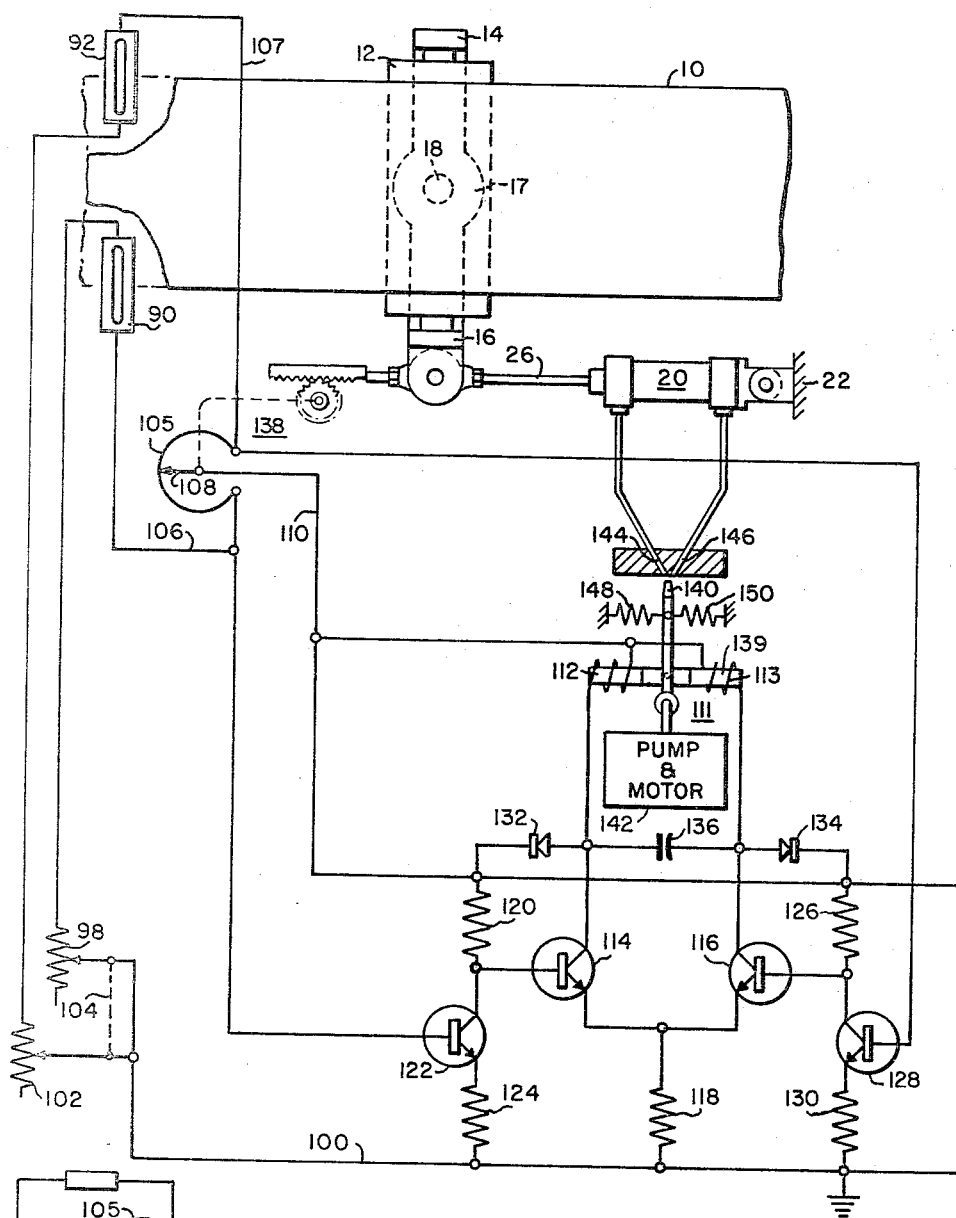
FIG. 3 is a schematic showing, in plan, of another embodiment of the steering and control device of this invention which can accommodate different widths of strip without adjustment of the sensing heads for each width.

Referring now to the drawings, and particularly to FIGS. 1 and 2, a strip of steel 10 is shown, which strip passes over and is suported by pass-line roll 12. The roll 12 is journaled for rotation by suitable bearings 14 and 16, and in a conventional manner is mounted on a base 17 having a pivot pin 18 about which the roll 12 can pivot so as to vector laterally a portion of the force of the moving strip 10 for steering, as will be described presently. The roll 12 is pivoted or rotated about pin 18 by means of a hydraulic cylinder 20. The hydraulic cylinder 20, mounted on a suitable support shown schematically at 22, has a piston 24 which operates a piston rod 26 which, in turn, is secured to one end of the roll 12. This reciprocating motion of the piston 24 will be converted to angular movement in the roll in a well-known manner. The cylinder 20 is actuated by a hydraulic control system 27 in response to a signal generated by a photocell 28 mounted below one edge of the strip 10.

A source of light 30 is mounted above the strip 10 and positioned to illuminate the photocell 28. The photocell 28 is supplied with power from a Variac auto transformer (a trade name of General Radio Company for an adjustable tap auto transformer) 32 of which the primary coil 34 is connected to a regulated voltage source V. The secondary coil 36 of the transformer 32 has a variable center tap mechanically connected to the end of the roll 12 by arm 38 and therefore adjustable by the pivotal movement of the roll. The center tap of the Variac transformer is electrically connected through rectifier 40 to one side of the photocell 28, and one end tap of the secondary coil 36 is connected through the rectifier 40 and solenoid 35 of the hydraulic control system 27 to the opposite side of the photocell 28. The hydraulic control system 27 includes a hydraulic pump and motor unit 42 adapted to supply hydraulic fluid under pressure to a pivotally mounted fluid discharge nozzle 44. The nozzle is biased to the right (as seen in FIG. 2) by a spring 46 and a biasing force to the left is provided by the solenoid 35 connected in series between the rectifier 40 and the photoelectric cell 28. The nozzle 44 is adapted to supply oil under pressure to a pair of spaced orifices 50 and 52 connected respectively by conduits 54 and 56 to opposite ends of hydraulic cylinder 20.

Assume that the strip is on the proper pass line, the roll 12 is at an angle that will not induce any lateral force vector to the strip, and the photocell 28 is positioned so that the strip blocks exactly half of the light from the light source. The sensitivity of the spring 46 is selected so that when exactly half of the photocell is illuminated, the resistance of the photocell will be such that the current in the solenoid 35 (from the secondary coil 36 of the transformer 32) will exactly balance the bias of the spring 46 and the nozzle 44 will be positioned mid-way between orifices 50 and 52. In this position the orifices 50 and 52 will receive equal fluid pressure from the nozzle 44 and the piston 24 in cylinder 20 will not move. As long as the strip stays on the pass line, half of the photocell will remain illuminated and no change in the system will take place, and thus there will be no corrective steering. However, if the strip should move off the pass line, the edge of the strip will move, thus either covering more or less than half of the photocell. Assume for the present that the strip moves upwardly as seen in FIG. 2. In this case, less than one-half of the photocell will be blocked by the strip, and more than half of it will be illuminated by the light source. This will decrease the resistance of the photocell; decreasing the resistance of the photocell (which is connected in series with the solenoid 35), will cause an increase of current in the solenoid 35 which will tend to pivot the nozzle 44 to the left as seen in FIG. 2. This will cause an increase in fluid pressure in orifice 52 and a decrease in fluid pressure in orifice 50. This pressure differential will drive the piston 24 of hydraulic cylinder 20 to the right. Rightward movement of the piston 24 will, through piston rod 26, cause a counterclockwise pivoting movement of the roll 12 about pivot point 18. This will cause a vectoring laterally (downwardly as shown in FIG. 2) of the force of the moving strip which will cause the strip to move laterally in the direction of this vector and hence back toward the pass line. However, without a proportioning control the roll would remain in this rotated or steering position until the strip has reached the pass line, i.e. the steering device will be receiving a signal to steer until the photocell has been covered and the signal would not cease until this time. Yet, when the signal ceased, the roll would still be rotated and a vector induced which would cause the strip to continue moving beyond the pass line, or over correcting. However, a proportioning control is provided through the mechanical tie between the end of the roll 12 and the center tap of the secondary coil 36 to adjust said center tap. Thus, when the roll 12 starts its pivoting movement (counterclockwise in this example), the voltage picked off the secondary coil 36 is reduced, thereby reducing the current in the solenoid 35; this reduction of current is in opposition to the increase in current caused by the decrease in resistance of the photocell 28. With this arrangement, the amount of deflection in the nozzle 44 is reduced proportionally to the amount of pivotal movement of the roll 12. This in turn will reduce the amount of correction angle of the roll as the correction of the position of the strip takes place, thus reducing the correction vector until, when the strip reaches the pass line, the correction vector will have become zero. Thus, if there is a large variation of the strip from the pass line, there will be initially introduced a very large corrective action signal in the solenoid 35 and this signal will be reduced, reducing the correction vector induced as the correction is taking place until the correction vector is completely eliminated just as connection is completed. In this manner of proportionally reducing the correction vector, over correction and hunting are prevented. Also, over correction, when the strip is stopped, is prevented since the correction will cease after the correction signal is balanced by the movement of the end of the roll 12. This, in effect, produces a proportioned control, utilizing a stationary sensing head, the signal of which is modified electrically by the action of the steering device. Of course, with this arrangement, the physical positioning of the photocell 28 must be changed with each strip width so that when the strip is on the pass line it will cover half of the photocell.

Referring now to FIG. 3, a sensing and control device is shown which is operable with various widths of strip without adjustment of the sensing heads. In this embodiment, a pair of photocells 90 and 92 are disposed at opposite edges of the strip and below the strip. These cells have an elongated configuration and the resistance of each is linearly proportional to the amount of illumination striking the cells. The length of these cells is disposed normal to the path of travel of the strip and the cells are located so that the strip of the average width to be used will extend approximately from the center of one to the center of the other. The width of the strip may then vary from this width an amount equal to the length of the photocells, without requiring repositioning of the photocells. Suitable light sources (not shown) are disposed above the strip and positioned to illuminate the photocells. These light sources may have a fluorescent or an incandescent bulb, and preferably the light is collimated to reduce the tendency of angle lighting illuminating a portion of the photocell above which the strip is disposed, or "cross-talk."

One side of photocell 90 is connected through variable resistor 98 to grounded conductor 100, and one side of the photocell 92 is connected through resistor 102 to conductor 100. A common adjustment, shown schematically as 104, is provided for the resistors 98 and 102 to adjust the sensitivity of the system. The other sides of the photocells 90 and 92 are connected to opposite ends of a potentiometer 105 by conductors 106 and 107, respectively. The potentiometer 105 has a variable adjustable center tap 108 connected to a conductor 110 which has impressed on it a voltage from source V. The conductor 110 is connected to the center of a split solenoid coil 111 having first and second sections 112 and 113. The end of coil section 112 is connected to collector electrode of transistor 114, and the end of coil section 113 is connected to the collector electrode of transistor 116. The emitter electrodes of transistors 114 and 116 are connected through a common resistor 118 to conductor 100. The base electrode of transistor 114 is connected through resistor 120 to conductor 110 and is also connected to the collector electrode of transistor 122. The emitter electrode of transistor 122 is connected through resistor 124 to conductor 100 and the base electrode of transistor 122 is connected to conductor 106. The base electrode of transistor 116 is connected through resistor 126 to conductor 110 and is also connected to the collector electrode of transistor 128. The emitter electrode of transistor 128 is connected through resistor 130 to conductor 100, and the base electrode of transistor 128 is connected to conductor 107. A pair of diodes 132 and 134 are connected between the opposite ends of coil 111 and conductor 110, and a condenser 136 is coupled across the opposite ends of the coil 111. These are to prevent unwanted current cycling in the coil 111. A mechanical linkage, generally designated as 138, is provided between the center tap 108 of the potentiometer 105 and the end of the roll 12, similar to the linkage in the embodiment of FIG. 2.

This system works in the following manner: The strip of material will normally be positioned to cover an equal amount of each of the photocells 90 and 92. When the photocells are equally covered, they will pass an equal amount of current which will be amplified equally by transistors 122, 128, 114 and 116, so that opposite two sections 112 and 113 of the coil 111 will receive equal current. The coil 111 is provided with a core 139 which operates the nozzle 140 of a pump and motor unit 142 similar to the unit shown in FIG. 2. The nozzle 140, when centered, will deliver equal pressure to orifices 144 and 146. When the nozzle is moved to the left (as seen in FIG. 3), a greater fluid supply is provided to orifice 144, and when the nozzle is moved to the right (as seen in FIG. 3), a greater supply is provided to orifice 146. Springs 148 and 150 are dampening springs to stabilize the nozzle and are of equal force. The hydraulic system operated by this pump and motor unit is identical to that shown in FIG. 2.

Still referring to FIG. 3, if the strip should deviate from the pass line and move upwardly (as seen in FIG. 3), a greater area of photocell 92 would be covered increasing its resistance and therefore decreasing the current flow therethrough. Conversely, the photocell 90 would have lesser area covered and a greater area uncovered which would decrease its resistance and increase the current flow therethrough. A reduction of the current flow through photocell 92 and an increase in current flow through photocell 90 will cause a greater current in the first section or left section 112 of coil 111, and a lesser current in the second section or right section 113 of coil 111. This will cause the core 139 to move to the left, moving the nozzle 140 to the left and causing greater pressure on orifice 144 than on orifice 146, which will cause the piston rod 26 to induce counterclockwise rotation of the roll 12. This will cause a lateral steering vector (downwardly as seen in FIG. 3), as was explained above. As the roll rotates counterclockwise, the linkage 138 will cause a change in the position of the center tap 108 of potentiometer 105 in a direction which will tend to equalize the amount of current in the two sections 112 and 113 of coil 111. The change in the position of the center tap 108 will be linearly proportional to the amount of rotation of the roll 12. This change in the center tap 108 will thus provide a balancing against the steering proportional to the magnitude of mis-alignment of the strip. Thus, the system will provide proportional vector steering similar to that provided by the system as shown in FIG. 2. Thus, within the limits of the length of the photocells, no mechanical adjusting need be made for various widths of strip, the system having the inherent characteristics of maintaining any width of strip centered between the photocells and therefore centered in the mill on the desired pass line. However, it should be noted that the common adjuster 104 for the value of the resistors 98 and 102 is used to provide a proper signal level as the system operates at different centered positions on the photocells for different widths of strip.

As can readily be seen, a bridge circuit is created as follows: Photocell 90 and resistor 98 comprise one arm; photocell 92 and resistor 102 comprise a second arm; and the third and fourth arms are formed by the portions of rheostat 105 on either side of center tap 108. Power is supplied to the bridge circuit from one terminal of the voltage source designated V to center tap 108 of potentiometer 105 through lead 110, and from the ground terminal through lead 100 to the variable taps of resistors 98 and 102. The unbalance in the circuit, if any, is then detected across potentiometer 105, the detected unbalance being amplified by the circuitry shown to energize coil 111 in the appropriate manner as previously described. Consequently, an increase in resistivity of the one arm of the bridge circuit containing photocell 92 will cause operation of the steering means and ultimately center tap 108 of potentiometer 105 in such a direction to reduce the resistance in potentiometer 105 in the adjacent arm of the bridge circuit which comprises that portion of potentiometer 105 between center tap 108 and lead 107 connected to photocell 92. Thus it can be seen that any unbalance caused by the strip deviation from the center line will cause corrective action of potentiometer 105 in such a manner to restore the bridge circuit to a balanced condition.

Figure 4:
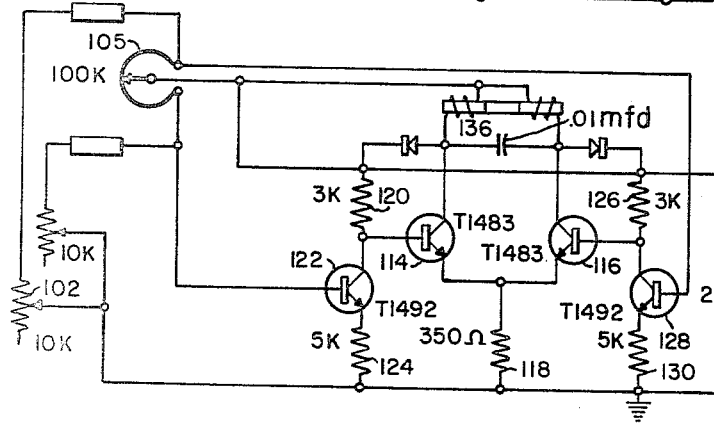
FIG. 4 is a view of the wiring diagram portion of FIG. 3 showing circuit component values.

Referring now to FIG. 4, the electric circuit of FIG. 3 is shown with values for the various circuit components given. It is to be understood however, that these values are illustrative only and not intended to be in any way limiting as to the scope of the invention. The designations of the transistors are stock numbers of the Texas Instrument Co., Inc.

The several embodiments illustrated have incorporated photo-resistive cells for the edge sensing devices, since these types of cells are very versatile and extremely well adapted for use in these devices, although photo-emissive cells may be used. Other types of sensing devices may also be used such as pressure responsive pneumatic sensing heads which are well known in the art.

Although several embodiments of this invention have been shown and described, various adaptations and modifications may be made without departing from the spirit and scope of the appended claims.

I claim:

1. In a device for maintaining a moving strip of material on a given pass line, which device includes steering means to vector a portion of the force of the moving strip laterally to change the position of the strip, which improvement comprises:

(a) photocell signal generating means disposed adjacent an edge of the strip and adapted to modify its control signal proportional to the deviation of the strip from the pass line;

(b) a transformer having a movable tap for varying the secondary coil thereof, said secondary coil being connected in circuit relation with said control signal generating means to provide an output indicative of the deviation of said strip from the pass line, the primary coil of said transformer being connected to an alternating current power source;

(c) an electromagnetic device connected in series relationship with said photocell, the series circuit so-formed receiving its power from said secondary coil, the position of said photocell and said movable tap being initially adjusted to prevent operation of the steering means when said strip is on the pass line, said electromagnetic device being adapted to operate the steering means; and
(d) other means actuated by said steering means and coupled to said movable tap to counteract the control signal change due to the deviation of said strip from the pass line, whereby the steering vector is eliminated when the strip returns to the pass line.

2. In a device for maintaining a moving strip of material on a given pass line, which device includes steering means to vector a portion of the force of the moving strip laterally to change the position of the strip, the improvement which comprises:
(a) first and second control signal generating means disposed adjacent opposite edges of the strip and adapted to modify the control signals proportional to the deviation of the strip from the pass line, the modification of the signal of the first signal generating means being opposite of the signal modification of the second signal generating means;
(b) an impedance device having a movable tap;
(c) a bridge circuit including said first and second control signal generating means in adjacent arms thereof, said impedance means being connected in parallel with the series circuit of said first and second control signal generating means, a voltage being supplied to said bridge circuit by connection at one point to said movable tap, and at the other point between said first and second control signal generating means, an output being taken across said impedance means, which output is indicative of the unbalance of said control signals;
(d) means responsive to said output to operate the steering means; and
(e) other means actuated by said steering means and coupled to said movable tap to restore the balance to said bridge circuit whereby the steering vector is eliminated when the strip returns to the pass line.

3. The combination of claim 2 wherein said impedance device comprises a rheostat.

4. The combination of claim 3 wherein said first and second control signal generating means include photocells having variable resistances for modifying the respective control signals.

5. The combination of claim 2 wherein amplifier means are in circuit relation with said bridge circuit and said means to operate the steering means.

References Cited by the Examiner

UNITED STATES PATENTS

| | | | |
|---|---|---|---|
| 2,777,069 | 1/1957 | Saeman | 226—21 X |
| 2,814,487 | 11/1957 | Medkeff | 226—19 X |
| 2,941,572 | 6/1960 | Densen et al. | 226—22 X |
| 3,040,944 | 6/1962 | Andersen | 226—21 |
| 3,090,534 | 5/1963 | Frommer et al. | 226—21 |
| 3,225,988 | 12/1965 | Drenning | 226—19 |

OTHER REFERENCES

Machine Design: (Web Guilding Control), September 1951, pp. 159–162.

M. HENSON WOOD, Jr., *Primary Examiner.*

J. N. ERLICH, *Assistant Examiner.*